Nov. 7, 1967 L. J. JOHNSON ET AL 3,351,839
TRANSISTORIZED DRIVEN POWER INVERTER
UTILIZING BASE VOLTAGE CLAMPING
Filed Dec. 23, 1964 3 Sheets-Sheet 1

INVENTORS
LEO J. JOHNSON
DONALD A. MELTON
BY A. M. Fernandez
ATTORNEY

INVENTORS
LEO J. JOHNSON
DONALD A. MELTON
BY

ATTORNEY

Nov. 7, 1967 L. J. JOHNSON ET AL 3,351,839
TRANSISTORIZED DRIVEN POWER INVERTER
UTILIZING BASE VOLTAGE CLAMPING
Filed Dec. 23, 1964 3 Sheets-Sheet 3

INVENTORS
LEO J. JOHNSON
DONALD A. MELTON
BY
A. M. Fernandez
ATTORNEY 3,351,839
TRANSISTORIZED DRIVEN POWER INVERTER UTILIZING BASE VOLTAGE CLAMPING Leo J. Johnson, Santa Ana, Calif., and Donald A. Melton, Livonia, Mich., assignors to North American Aviation, Inc.

Filed Dec. 23, 1964, Ser. No. 420,587
8 Claims. (Cl. 321—45)

ABSTRACT OF THE DISCLOSURE

A transistorized driven power inverter for providing a square wave signal in synchronism with, and of greater power than an input square wave source. The inverter utilizes a pair of transistors in a driven magnetic multivibrator circuit including a transformer having feedback windings. An additional center tapped winding on the multivibrator transformer is used in conjunction with a pair of diodes to clamp and limit the base voltage of one transistor while the other transistor is in carrier storage conduction. This assures that the clamped transistor will not turn on until the end of the carrier storage time.

This invention relates to an electronic inverter, and more particularly, to a driven inverter for developing an alternating signal, preferably a square wave, for digital control and data processing systems.

In many applications, such as in control or data processing systems, its is desirable to apply an alternating signal or square wave to a great number of circuits for operation or synchronization. To accomplish that, a single source is provided to drive all of the digital circuits or synchronize them in parallel through a clock pulse distribution system. The use of more than one signal source to meet the load requirements would give rise to many problems, particularly in maintaining synchronous operation. Accordingly, an object of this invention is to provide an improved electronic power inverter.

Transistor switches have come into common use in inverters, particularly since the load capacity of power transistors has been increased. However, the carrier storage effect of transistors imposes a definite limitation on the speed with which a transistor may be switched off after it has been driven to saturation. Accordingly, another object of this invention is to eliminate the effects of carrier storage in switching transistors of an inverter. Still another object is to provide a means for using the storage effect of the switching transistors for useful work in inverters.

These and other objects of the invention are achieved by the use of feed-back windings connected in series with the input signal source applied to the base electrodes of transistor switches to alternately switch them off. When the input signal to the base electrodes of a pair of switching transistors reverses in polarity, feed-back windings couple a signal from the collector circuit of the conducting transistor to the base electrodes of both transistors to effectively cancel the input signal to each until the conducting transistor stops conduction after a lapse of the carrier storage time. Then the voltage across the feed-back windings reverse in polarity and again at the input signals to switch the transistors. High current spikes in the output from the inverter are thus eliminated since over lapping conduction of both transistors due to the carrier storage effect is prevented. The feed-back windings assist in switching the transistors, thereby reducing the power necessary to drive the inverter.

Other objects and advantages will become apparent from the following description with reference to the accompanying drawings in which.

Figure 1:
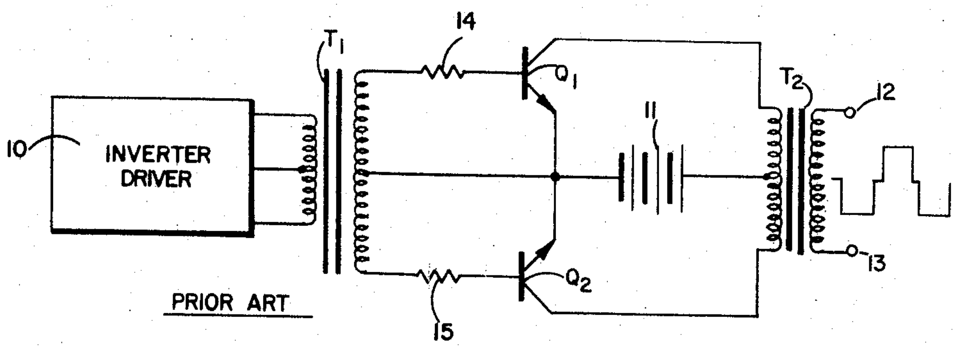
FIGURE 1 is a schematic diagram of a driven inverter according to the prior art.

Referring to FIGURE 1 illustrating a driven inverter according to the prior art, it may be seen that there is a period of time when both switching transistors $Q_1$ and $Q_2$ being driven by an alternating signal from a source 10 are conducting due to the carrier storage effect of the transistor being switched from a state of conduction at saturation, thereby effectively shorting the DC power supply 11 through the center tapped primary of the output transformer $T_2$. This causes distortion of the desired square wave at output terminals 12 and 13 in the form of notches when both transistors are on due to the storage time of the transistor being turned off. For many applications, a more perfect square wave is desired.

Assuming a square wave input from the inverter 10 to the switching transistors $Q_1$ and $Q_2$ through a center tapped transformer $T_1$ and current limiting resistors 14 and 15, the square wave signal desired at the output terminals 12 and 13 may be achieved in accordance with the present invention by holding the non-conducting transistor off until the conducting transistor has ceased conduction due to carrier storage. That is accomplished in a novel manner by secondary windings 20 and 22 which feed back from the output transformer $T_2$ voltage signals which hold the non-conducting transistor off after the input signal to the base of the transistors $Q_1$ and $Q_2$ have reversed polarity. The voltage signal fed back persists until current in the primary of the transformer $T_2$ due to carrier storage has ceased. In that manner, there is no over-lapping conduction of transistors $Q_1$ and $Q_2$ due to carrier storage.

Figure 2:
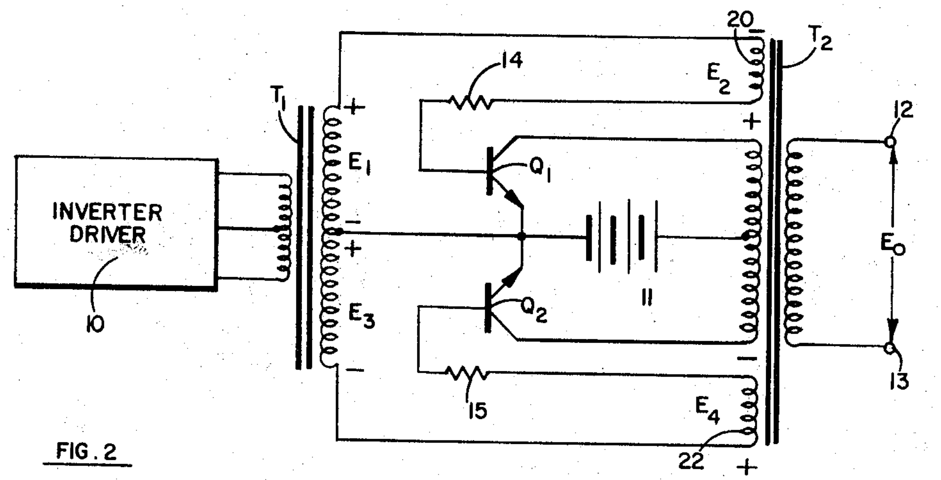
FIGURE 2 is a schematic diagram of a driven inverter according to the present invention.

In order to understand the operation of the circuit in FIGURE 2, it may be assumed that the inverter driver 10 couples a square wave voltage signal of about 3 volts to the base electrodes of the transistors $Q_1$ and $Q_2$ on either side of the center-tapped secondary winding of the transformer $T_1$. That voltage is selected to be approximately half the amplitude necessary to drive the switching transistors $Q_1$ and $Q_2$ into saturation through resistors 14 and 15. The turn ratio between the primary winding of the output transformer $T_2$ and the feed-back windings 20 and 22 is selected to obtain an additional drive voltage in each of about 3 volts, thereby reducing the driven power to half of that required by the prior art circuit of FIGURE 1.

The corresponding ends of the feed-back windings 20 and 22 coupled to the primary winding of the transformer $T_2$ are indicated by dots in the conventional manner. The sense of the secondary winding connected to the output terminals 12 and 13 is not indicated and may be arbitrarily selected. If the input signals $E_1$ and $E_3$ coupled to the base electrodes of the transistors $Q_1$ and $Q_2$ are equal to each other with the polarities shown, and equal to the voltages $E_2$ and $E_4$ induced in the feed-back windings 20 and 22, the transistor $Q_1$ will conduct at saturation with the total forward drive voltage of +6 volts and the transistor $Q_2$ will be cut off by a total voltage of −6 volts.

Assuming the transistor $Q_1$ is conducting at saturation and the transistor $Q_2$ is cut off, when the input signals $E_1$ and $E_3$ simultaneously change polarity, the total voltage applied to the base electrode of each of the transistors $Q_1$ and $Q_2$ is effectively 0 volt since current in the primary winding of the output transformer $T_2$ maintained by the carrier storage of the transistor $Q_1$ holds the induced voltages $E_2$ and $E_4$ with the same polarities. Therefore, during the carrier storage time of the transistor $Q_1$, the feed-back voltages $E_2$ and $E_4$ are equal but opposite to the input voltages $E_1$ and $E_3$, respectively.

After the carrier storage time of the transistor $Q_1$, the voltage across the primary winding of the output transformer $T_2$ decreases rapidly, thereby causing the feed-back voltages $E_2$ and $E_4$ to decrease rapidly. As the feed-back voltage $E_2$ decreases, the total voltage applied to the base electrode of the transistor $Q_1$ becomes more and more negative. Similarly, as the feed-back voltage $E_4$ decreases the total voltage applied to the base electrode of the transistor $Q_2$ becomes more and more positive, thereby turning on the transistor $Q_2$.

When the transistor $Q_2$ turns on, the polarity of the feed-back voltages $E_2$ and $E_4$ is reversed. In that manner the drive voltages for the transistors $Q_1$ and $Q_2$ are rapidly switched to $-6$ volts and $+6$ volts, respectively, to drive the transistor $Q_2$ rapidly to saturation and cut off the transistor $Q_1$.

Figure 4:
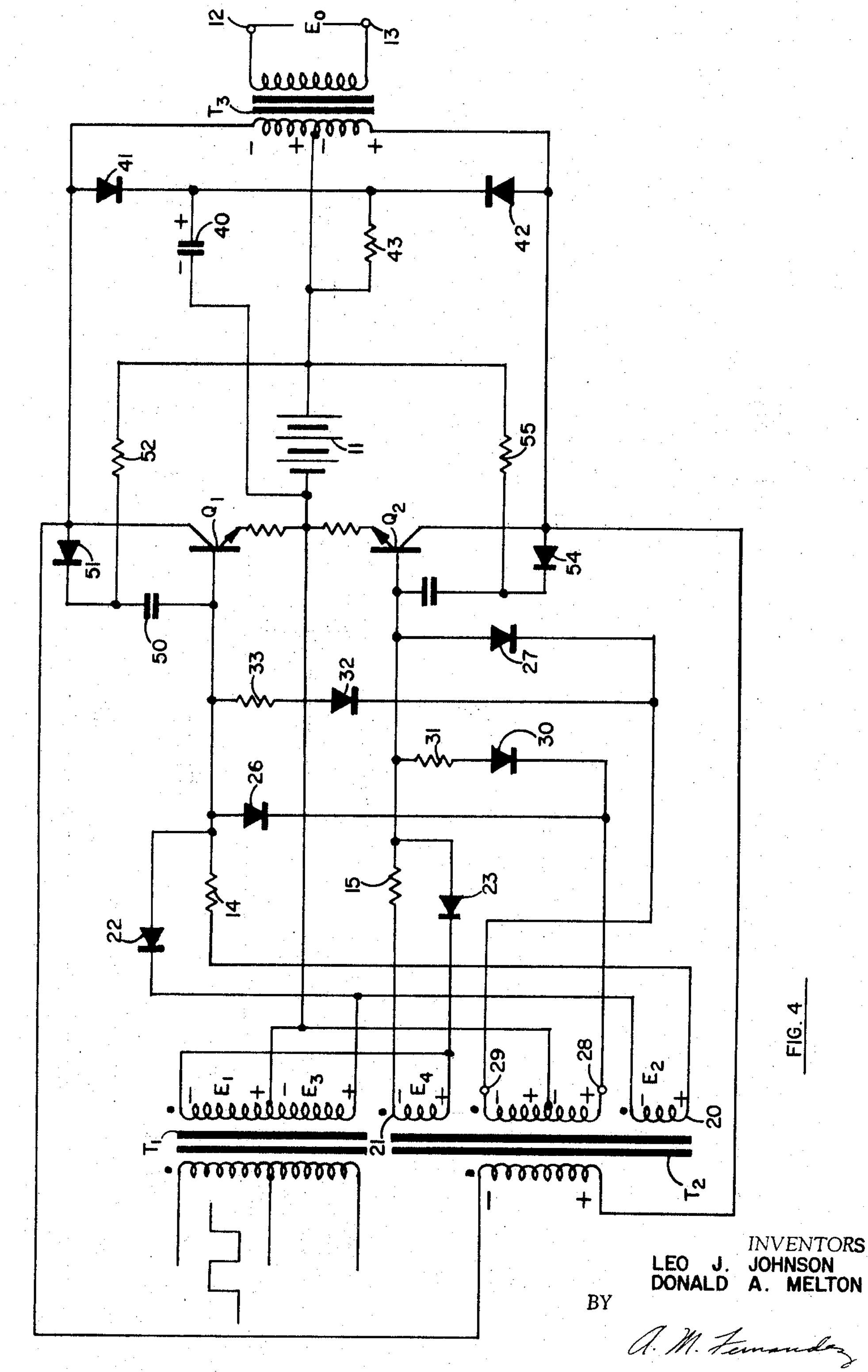
FIGURE 4 is a diagram of a preferred embodiment of the invention.
Figure 3:
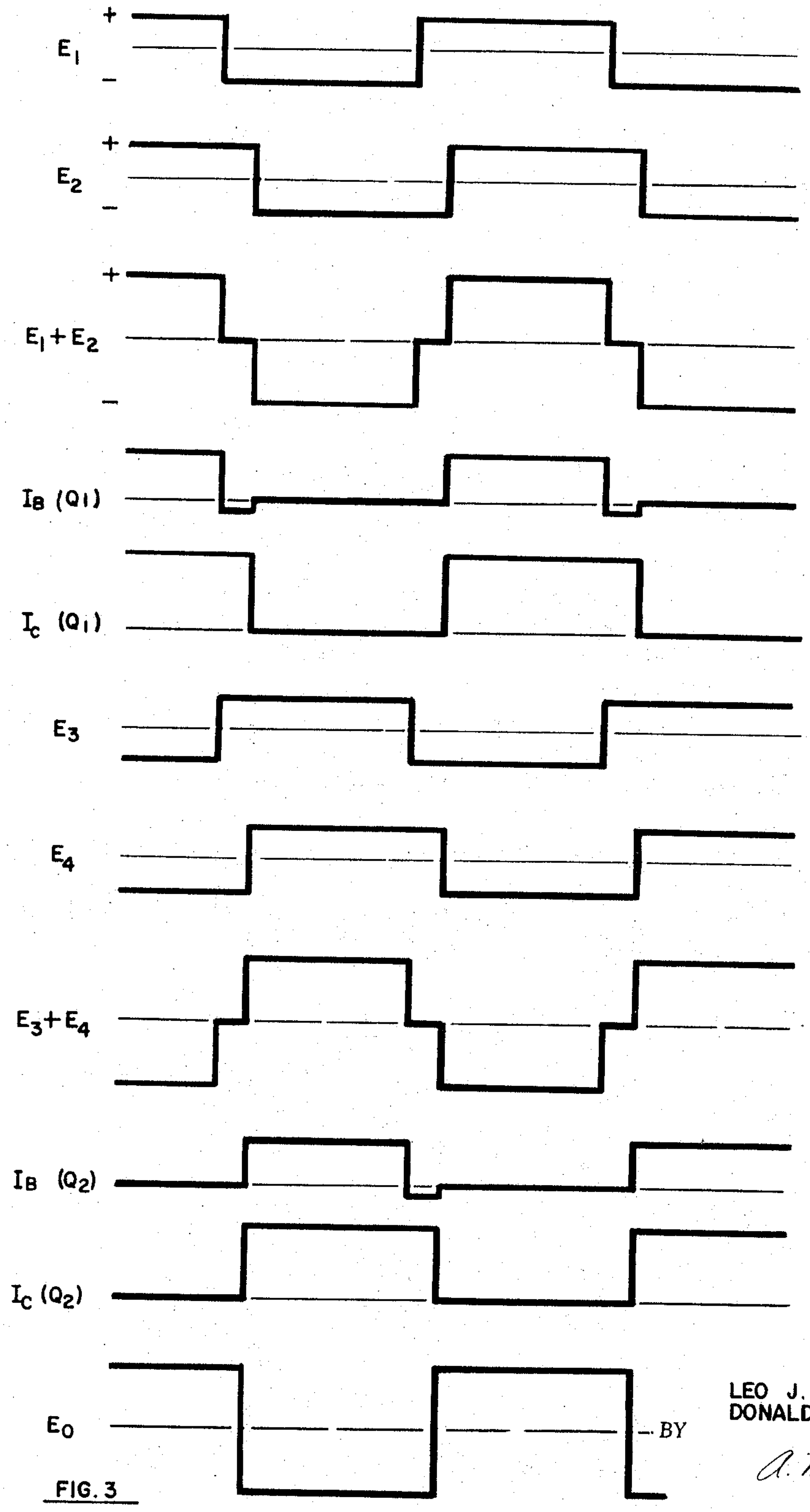
FIGURE 3 illustrates voltage and current waveforms of the circuit in FIGURE 2 during one complete cycle of operation.

FIGURE 3 shows current and voltage waveforms of the circuit in operation. The first complete half cycle of operation illustrated corresponds to the operation just described of switching the transistor $Q_1$ off from saturation and switching the transistor $Q_2$ on to saturation. The voltages $E_1$ and $E_2$ produced by the series connected windings are algebraically added to provide the sum voltage $E_1+E_2$ between the base and emitter electrodes of the transistor $Q_1$. It is preferable to draw some negative current from the base of the transistor $Q_1$ during the carrier storage period as shown in the waveform for the base current $I_B$ to take it out of storage faster. The manner in which such negative current may be provided is illustrated in FIGURE 4.

The collector current $I_C$ of the transistor $Q_1$ persists until the end of the carrier storage period, thereby maintaining the polarity of the feed-back voltages $E_2$ and $E_4$ the same until the end of the carrier storage time when the polarity of those voltages reverse as shown in the waveforms of FIGURE 3. The combined positive voltages $E_3$ and $E_4$ are then sufficient to turn the transistor $Q_2$ on and drive it to saturation by a high positive base current as illustrated by the waveform for the base current $I_B$. The resulting collector current $I_C$ of the transistor $Q_2$ is then produced without any overlap due to carrier storage in order to provide a more nearly square output waveform $E_o$.

Since the circuit of FIGURE 2 is symmetrical about the emitters of the transistors $Q_1$ and $Q_2$, its operation during the second half cycle illustrated by the waveforms of FIGURE 3 is the same except for the reversal of polarities.

If the voltages $E_1$ and $E_2$ in FIGURE 3 are not equal, there will be a period during which a forward bias equal to the difference may appear at the base of the transistor $Q_1$. To overcome the possibility of producing such an unwanted forward bias on the transistors $Q_1$ and $Q_2$, the circuit of FIGURE 2 may be modified in the manner shown in FIGURE 4 illustrating a preferred embodiment of the invention.

In FIGURE 4, a separate output transformer $T_3$ is employed to couple the collector currents of the transistors $Q_1$ and $Q_2$ to the output terminals 12 and 13. The ends of the primary winding of the transformer $T_2$ are connected to the collectors of the transistors $Q_1$ and $Q_2$ as in the circuit of FIGURE 2 but a center tap connection is not required since the output $E_o$ is being taken from the third transformer $T_3$. The third secondary winding of the transformer $T_2$ is now employed to clamp and limit the base voltages of the transistors $Q_1$ and $Q_2$. The feed-back windings 20 and 21 remain the same in form and function except that diodes 22 and 23 are provided to draw reverse bias current from the base electrodes of the transistors $Q_1$ and $Q_2$ while being switched off, thereby to decrease the carrier storage time. For instance, when the transistor $Q_1$ is being switched off, the drive voltage $E_3$ is reversed in polarity to place a negative potential on the cathode of the diode 22. The base electrode of the transistor $Q_1$ is then at approximately $+1$ volt so that the diode 22 tends to be forward biased by approximately $+4$ volts. With a negative potential applied to the base of the transistor $Q_1$ through the low impedance path of the forward biased diode 22, reverse base current is conducted more quickly to sweep out the carriers in the transistor $Q_1$, thereby reducing the carrier storage time.

While the transistor $Q_1$ is conducting at saturation and the transistor $Q_2$ is cut off, the third secondary winding of the transformer $T_2$ connected to terminals 28 and 29 is induced with voltages having the polarities shown such that the terminal 28 is positive and the terminal 29 is negative. Each half of that center-tapped secondary winding produces a voltage of 3 volts so that the terminal 29 is at $-3$ volts while the transistor $Q_1$ is conducting at saturation and the transistor $Q_2$ is cut off. When the drive signals $E_1$ and $E_3$ reverse in polarity, the terminal 29 remains at $-3$ volts to clamp the base electrode of the transistor $Q_2$ to a negative potential through diode 27 while the transistor $Q_1$ is in carrier storage conduction, thereby further assuring that the transistor $Q_2$ will not be turned on until the end of the carrier storage time. Diode 26 performs the same function vis-a-vis transistor $Q_1$ during the next half cycle.

A pair of circuits comprising a diode 30 in series with a resistor 31, and a diode 32 in series with a resistor 33, are connected to the terminals 28 and 29 but serve no function while the circuit is operating. Those circuits are provided to assure that the driven inverter will not continue to operate after the input signal to the transformer $T_1$ is cut off. Without those circuits, the driven inverter may oscillate at a lower frequency after the input signal is cut off because either of the transformers $T_2$ and $T_3$, or both, may saturate causing the driven inverter to operate like an oscillator of the saturating flux type. The added circuits assure that insufficient positive voltage is present at the base electrodes of the transistors $Q_1$ and $Q_2$ to sustain oscillations after the inverter driver has been shut down. However, it should be noted that such undesired oscillations may be prevented in some other manner.

A capacitor 40 is connected to a pair of diodes 41 and 42 and a biasing resistor 43 to provide a circuit for removing voltage spikes at the collector electrodes. The capacitor 40 is charged to a potential equal to twice the voltage of the source 11 during the steady state portions of the inverter operation. Then any voltage spike greater than the voltage stored in the capacitor 40 which may appear on the collector of either transistor $Q_1$ and $Q_2$ is clamped by the diodes 41 and 42, allowing the capacitor 40 to charge and thereby absorb the spikes. Any charge thus accumulated during a transient period is discharged through the bias resistor 43 during the steady state portion of each cycle.

A circuit comprising a capacitor 50, a diode 51 and a bias resistor 52 is also provided for removing voltage spikes from the output signal. However, it functions by controlling the turn off time of the transistor $Q_1$, thereby reducing inductive voltage spikes. The resistor 52 insures that capacitor 50 is charged not less than the voltage of source 11. When the transistor $Q_1$ is turned off, the collector voltage rises to the potential of the source 11 very rapidly. At that potential, the diode becomes forward bias and starts to conduct thereby allowing the capacitor 50 to absorb the transient voltage signal until the capacitor 50 charges to twice the amplitude of the voltage source 11. It remains at that voltage during the time the transistor $Q_1$ is turned off. When the transistor $Q_1$ is again turned on, the capacitor discharges to the potential of the source 11. The effect of the capacitor 50 (which, together with the transistor $Q_1$, forms a parallel feed-back integrator)

is analogous to the "Miller" effect, which is defined as the amplification of the capacitance between the output electrode and the input electrode of active elements in certain amplifier circuits, such as the grid plate capacitance in a vacuum tube DC amplifier. A capacitor 53 together with a diode 54 and a resistor 55 form a similar circuit for the operation of the transistor $Q_2$.

Although only one switching transistor is shown in each half of the symmetrical circuit illustrated in FIGURES 3 and 4, it should be understood that such transistors are intended for high power output in the order of 700 watts or more with an input from the inverter driver 10 of approximately 20 watts. Accordingly, it may be desirable to provide more than one transistor in each half of the circuit by connecting additional transistors in parallel, collector to collector, base to base, and emitter to emitter. However, to assure that each transistor will carry its share of the load, a separate emitter resistor, such as the emitter resistors shown for the transistors $Q_1$ and $Q_2$ in FIGURE 4, should be provided. If all resistors are of equal value, any variation in the parameters of the transistors as a function of temperature or time will not cause an unequal distribution of the current load since any change in internal impedance of a given transistor will be negligible as compared to the impedance of the emitter resistor. The emitter resistors need only be in the order of approximately 0.10 ohm to assure equal current distribution between parallel transistors.

While the principles of the invention have now been made clear in an illustrative embodiment there will be immediately obvious to those skilled in the art many modifications in structure, arrangement, the elements and components used in the practice of the invention, and otherwise, which are particularly adapted for specific environments and operating requirements without departing from those principles. The appended claims are therefore intended to cover and embrace any such modifications within the limits only of the true spirit and scope of the invention.

What is claimed is:

1. A driven inverter comprising
an output transformer having a center tapped primary winding and a secondary winding,
first and second transistors, each having emitter, collector and base electrodes,
means for connecting a source of direct current in series between the emitter electrode of each of said transistors and the center tap of the primary winding of said output transformer,
first and second input terminals,
a second transformer having a primary winding and at least two secondary windings,
means for connecting one of said secondary windings of said second transformer in series between the base electrode of said first transistors and said first input terminal,
means for connecting another of said secondary windings of said second transformer in series between the base electrode of said second transistor and said second input terminal,
means for coupling the collector electrodes of said first and second transistors to opposite ends of the primary winding of said second transformer,
means for coupling oppositely phased alternating signals between the emitter electrodes of said first and second transistors and said first and second input terminals, respectively, and a pair of diodes, each being connected in parallel with respective ones of said two secondary windings of said second transformer, each diode being connected in a direction for forward conduction of the base-emitter junction of its associated transistor.

2. A driven inverter as defined in claim 1 including means connected to the base of each transistor for clamping its base potential below cutoff while the other transistor is conducting due to carrier storage.

3. A driven inverter as defined in claim 1 wherein said second transformer further includes a third secondary winding having a center tap,
means for connecting said center tap of said third secondary winding to the emitters of said transistors,
a first diode,
means for connecting said first diode between one end of said third secondary winding and the base of said first transistor, for clamping the base of said first transistor while said secondary transistor is in carrier storage conduction,
a second diode, and
means for connecting said second diode to the base of said second transistor, for clamping the base of said second transistor while said first transistor is in carrier storage conduction.

4. A driven inverter as defined in claim 3 further comprising
means for removing voltage spikes at the collectors of said transistors, said means for removing comprising
a pair of diodes connected in series, in oppositely poled relationship, across the primary of said output transformer, a capacitor connected between the common junction of said diodes and the emitters of said transistors, and
a resistor connected between said common junction of said diodes and the center tap of said primary winding.

5. A driven inverter comprising
a pair of transistors, each having collector, emitter and base electrodes,
an output transformer having a center tapped primary winding and a secondary winding,
means for connecting a source of direct current in series with the emitter-collector circuit of one said transistor and one side of said center tapped primary winding, and in series with the emitter-collector circuit of the other of said transistors and the other side of said center tapped primary winding,
an input transformer having a center tapped secondary winding, the number of turns of each half of said center tapped secondary winding being selected to provide approximately half the forward drive voltage required across the base-emitter circuit of said transistors to drive them into saturation in response to a square wave input signal applied to a primary winding thereof,
an auxiliary transformer having a primary winding and at least two secondary windings of equal turns,
means for connecting one of said secondary windings of said auxiliary transformer in series with one half of said center tapped secondary winding and the base-emitter circuit of one of said transistors, the number of turns and sense of said secondary winding being selected to provide approximately half the forward drive voltage required across the base-emitter circuit of the one of said transistors to cause it to conduct at saturation when it conducts collector current,
means for connecting the other of said secondary windings of said auxiliary transformer in series with the other half of said center tapped secondary winding and the base-emitter circuit of the other one of said transistors, the number of turns and sense of said secondary winding being selected to provide approximately half the forward drive voltage required across the base-emitter circuit of the other of said transistors to cause it to conduct at saturation when it conducts collector current, and
a pair of diodes, each being connected in parallel with respective ones of said two secondary windings of said auxiliary transformer, and each being connected in a direction for forward current conduction in a direction opposite the forward current conduction of the base-emitter junction of its associated transistor.

6. A driven inverter as defined in claim 5 including means connected to the base of each transistor for clamping its base potential below cutoff while the other transistor is conducting due to carrier storage.

7. A driven inverter as defined in claim 5 wherein said auxiliary transformer further includes a third secondary winding having a center tap, means for connecting said center tap of said third secondary winding to the emitters of said transistors, a first diode, means for connecting said first diode between one end of said third secondary winding and the base of said first transistor, for clamping the base of said first transistor while said second transistor is in carrier storage conduction, a second diode, means for connecting said second diode to the base of said second transistor for clamping the base of said second transistor while said first transistor is in carrier storage conduction.

8. A driven inverter as defined in claim 5 further comprising means for removing voltage spikes at the collectors of said transistors, said means for removing comprising a pair of diodes connected in series, in oppositely poled relationship, across the primary of said output transformer, a capacitor connected between the common junction of said diodes and the emitters of said transistors, and a resistor connected between said common junction of said diodes and the center tap of said primary winding.

References Cited

UNITED STATES PATENTS

| | | | |
|---|---|---|---|
| 2,785,236 | 3/1957 | Bright et al. | |
| 2,987,664 | 6/1961 | Poirier et al. | 321—18 X |
| 3,030,521 | 4/1962 | Lucke | 302—88 |
| 3,117,270 | 1/1964 | Tailleur | 307—18 X |
| 3,206,694 | 9/1965 | Bates | 331—47 |
| 3,268,833 | 8/1966 | Miller et al. | 331—112 |

JOHN F. COUCH, *Primary Examiner.*

WM. SHOOP, *Assistant Examiner.*